United States Patent [19]

Moran

[11] Patent Number: 4,870,381
[45] Date of Patent: Sep. 26, 1989

[54] SEARCH COIL ASSEMBLY FOR METAL DETECTORS

[75] Inventor: James M. Moran, Leominster, Mass.

[73] Assignee: Barkley & Dexter Laboratories, Inc., Fitchburg, Mass.

[21] Appl. No.: 206,299

[22] Filed: Jun. 14, 1988

Related U.S. Application Data

[62] Division of Ser. No. 56,241, Jun. 1, 1987, Pat. No. 4,833,773.

[51] Int. Cl.$^4$ ............................................. H01F 15/00
[52] U.S. Cl. .................... 336/84 C; 324/239;
336/92; 336/96; 336/208; 264/272.19
[58] Field of Search ............. 336/84 R, 84 C, 92,
336/96, 198, 208, 205, 105, 107; 29/602.1, 605;
324/228, 238, 239, 240, 241, 242, 243;
264/272.19, 46.6, 46.9

[56] References Cited

U.S. PATENT DOCUMENTS

| | | | |
|---|---|---|---|
| 2,237,254 | 4/1941 | Broekhuysen | 324/226 X |
| 3,278,455 | 10/1966 | Feather | 29/602.1 X |
| 3,361,962 | 1/1968 | Albrecht | 324/243 |
| 3,368,175 | 2/1968 | Giegerich et al. | 336/84 C |
| 4,683,454 | 7/1987 | Vollmer et al. | 336/96 X |

FOREIGN PATENT DOCUMENTS 96568 12/1983 European Pat. Off.
2146128 4/1985 United Kingdom.

Primary Examiner—Thomas J. Kozma

[57] ABSTRACT

A coil assembly for a metal detector of the type used for detecting metal fragments in foodstuffs and pharmaceuticals, the coil assembly comprising a frame of non-metallic, the frame having an aperture therethrough for the passage of material undergoing inspection, coils of electrically conductive strands wound upon the frame, plastic material adhered to the frame and coils, less the aperture portion of the frame, and a coating of metal adhered to the plastic material to encase the plastic material in a metal layer.

1 Claim, 3 Drawing Sheets

SEARCH COIL ASSEMBLY FOR METAL DETECTORS

CROSS-REFERENCE TO RELATED APPLICATION

This is a division of applicationn Ser. No. 056,241, now Pat. No. 4,833,773 filed June 1, 1987 in the name of James M. Moran.

BACKGROUND OF THE INVENTION

1. The Field of the Invention

This invention relates to metal detectors of the type used to detect metal fragments in foodstuffs and pharmaceuticals, and is directed more particularly to an improved search coil assembly for such metal detectors.

2. Description of the Prior Art

In many industries, such as food processing, non-metallic materials, such as foodstuffs, are conveyed automatically to various processing machines and stations. A problem arises when tramp metal is introduced into the material stream. Such tramp metal can constitute a hazard if sold to the public in foodstuffs and even in the processing area can constitute a hazard for some types of processing machinery.

It is known in the art that the non-metallic material can be passed through an electromagnetic field of a search coil and that if tramp metal is present in the material stream such metal will disturb the electromagnetic field of the search coil and induce a detectable error signal in the search coil. Responsive to the error signal, the material stream can be stopped or diverted to a waste container, accompanied, if desired, by visual and audible alarm means.

The sensitivity of such search coil metal detector systems is related to the size of an aperture through which the non-metallic stream is directed and around which is disposed the search coil. The smaller the aperture, or passage hole, for the product under test, the smaller is the size of metallic particles that can be detected. It has, therefore, been common practice to select an aperture size which allows the product, and its conveying belt, to pass through the aperture with minimum clearance.

For example, if it were required to inspect a packaged food product whose outside dimensions were 4"×5"×10", with the 10" dimension occurring in the direction of travel, the aperture size chosen probably would be on the order of 5"×7". Since package or product size is a result of particular marketing and manufacturing requirements peculiar to each product at a given time, the resultant effect has been to require a very large number of different sizes and shapes of metal detectors to be maintained in inventory, or to require an extensive time delay in the making of a custom metal detection machine for a new sized product.

The size and shape requirements have resulted in a difficult manufacturer—end user relationship. The manufacturer must maintain a large number of different sizes, many of which may be inventoried for an uneconomical period of time. The alternative, as mentioned above, is to build to order. Because of the laborious manner in which the search coil assemblies are made, producing a particular size and/or shape to order is quite expensive and time-consuming.

Because of the expense involved, it is customary that such detectors are used only at processing plants or distribution points. However, at times metal is introduced into the product after the product leaves the processing plant and before sale to a consumer. Such is likely to be the case in occasions of "tampering".

The present state of the art in the manufacture of metal detector seach coil assemblies requires the production of a metal box to serve as a metallic shield around the electrical coils. When the correct size box is made, the conductive coils are wound on a non-metallic coil form and the form, or frame, with the coils would thereon, is inserted into the metal box and suspended therein. The space between the coil and the box is then filled with non-metallic filler. The filler acts as a moisture sealant, as well as a retainer for reducing the relative motion between the metal case and the coil. Any relative motion between the coils and the surrounding metal case results in a spurious signal.

The above-described method requires, in ordinary practice, about ten to thirty weeks to produce a detector apparatus ready for commercial use, an obviously lengthy and very expensive method of production.

Accordingly, an object of the invention is to provide an improved search coil assembly capable of being made in a manner greatly reducing the time required to produce such components, so that metal detectors of various sizes may be produced quickly, without the need for maintaining large inventories.

A further object of the invention is to provide a search coil assembly for metal detection devices, capable of being made by a method providing such economic benefits as to render purchase and use of such devices at the retail level practicable from an economic standpoint.

SUMMARY OF THE INVENTION

With the above and other objects in view, as will hereinafter appear, a feature of the present invention is the provision of a metal detector search coil assembly comprising a frame of non-metallic material, the frame having an aperture therethrough, coils of electrically conductive strands wound upon exterior surfaces of top, bottom and side walls of the frame, plastic material adhered to the exterior surfaces with the coils being embedded in the plastic material, and a coating of metal adhered to the exterior surface of the plastic to envelop the plastic material in the metal. The coating of metal is characterized by having been formed and hardened in place on the plastic material.

The above and other features of the invention, including various novel details of construction and combinations of parts, will now be more particularly described with reference to the accompapnying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
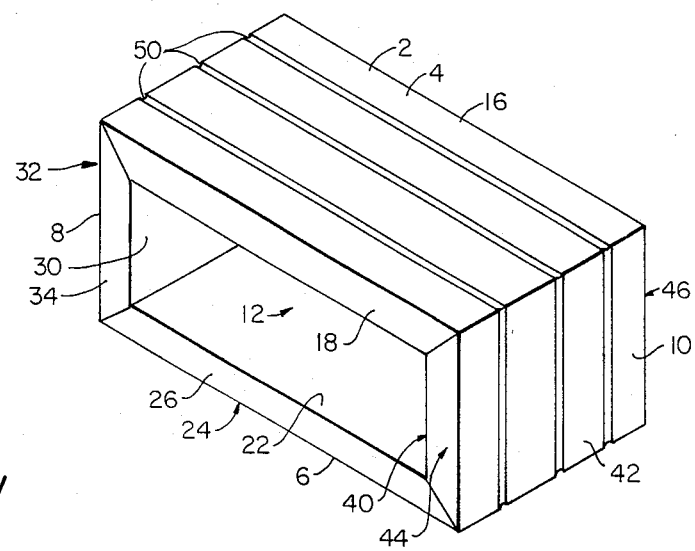
FIG. 1 is a perspective view of one form of search coil frame provided in accordance with the invention.

Referring to the drawings, it will be seen that there is provided a frame 2 having a top member 4, a bottom member 6, and side members 8, 10, defining an aperture 12 therethrough. The frame is constructed of non-metallic material, such as plastic or wood. The members 4, 6, 8, 10 are preferably glued together, or held together by brass screws (not shown). The top frame member 4 has an internal surface 14, an external major surface 16, and end surfaces 18, 19. The bottom frame member 6 is similarly provided with an internal surface 22, an external major surface 24, and end surfaces 26, 28. The first frame side member 8 is provided with an internal surface 30, an external major surface 32, and end surfaces 34, 36. In like manner, the second frame side member 10 is provided with an internal surface 40. an external major surface 42, and end surfaces 44, 46.

In the embodiment shown in FIG. 1, each of the external major surfaces 16, 24, 32 and 42, is provided with three grooves 50, which are in alignment from frame member to frame member to provide continuous grooves around the exterior of the frame.

After completion of the frame 2, electrically conductive strands comprising wires 60, are wound upon the frame, the wires 60 being disposed in the grooves 50. Typically, the wires 60 are arranged in three groups, defining three coils, each coil made up of one or more wires. A "transmit" coil 62 is disposed centrally of the frame, and on either side thereof is disposed a "receive" coil 64, 66. Each of the coils 62, 64, 66 has two free ends, respectively, 62a, 62b, 64a, 64b, and 66a, 66b. The free ends 62a and 62b of the transmit coil lead away from the assembly, and the free ends 64a, 64b, 66a and 66b of the receiving coils lead away from the assembly.

In an alternative embodiment (not shown) the electrically conductive strands comprise conductive tape which is applied to the form without the need of grooves, but otherwise in substantially the same arrangement as described above relative to the use of wires as conductive strands.

Figure 2:
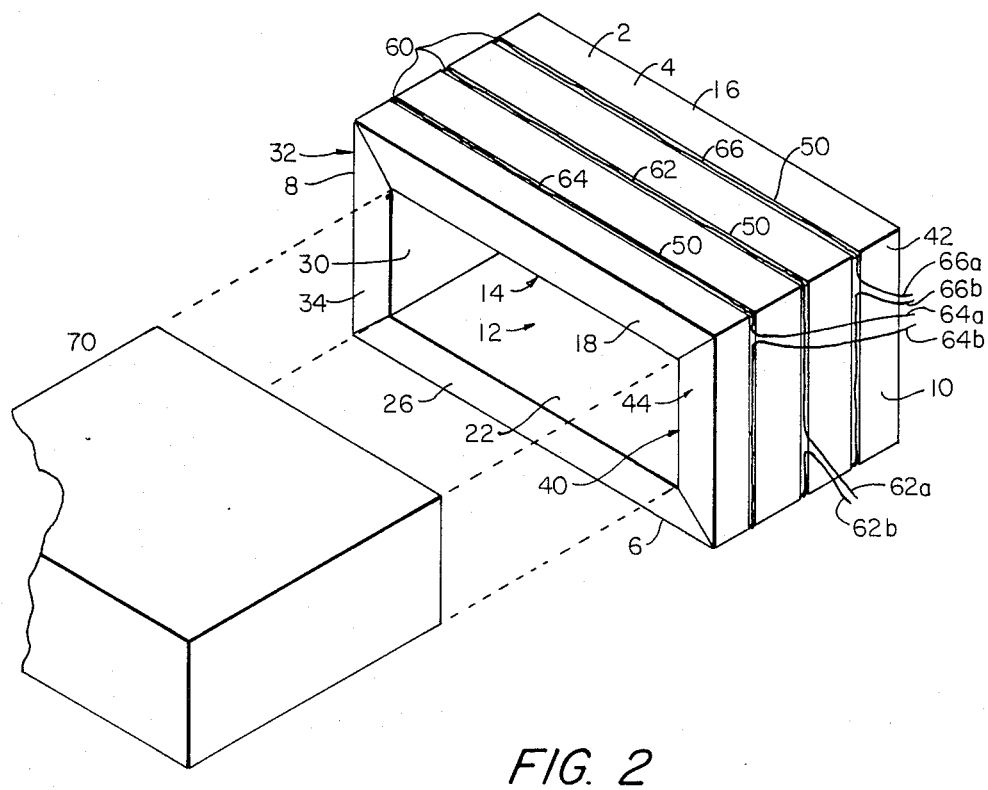
FIG. 2 is a perspective view, similar to FIG. 1, but showing the addition of coils to the frame.

In operation of the search coil assembly, it is imperative that there be no relative movement between the wires 60 (or tapes) and the frame 2. To insure that such movement does not occur, the wires 60 (less the free ends) are embedded in molten plastic. It is also important that no moisture reach the wires. The embedding of the wires in plastic further serves to keep the wires free from moisture. Before applying plastic to the assembly, the aperture 12 is filled by a block 70 which shields the frame internal surfaces 14, 22, 30 and 40 (FIG. 2) and supports the frame to prevent distortion thereof during the plastic application stage.

Figure 3:
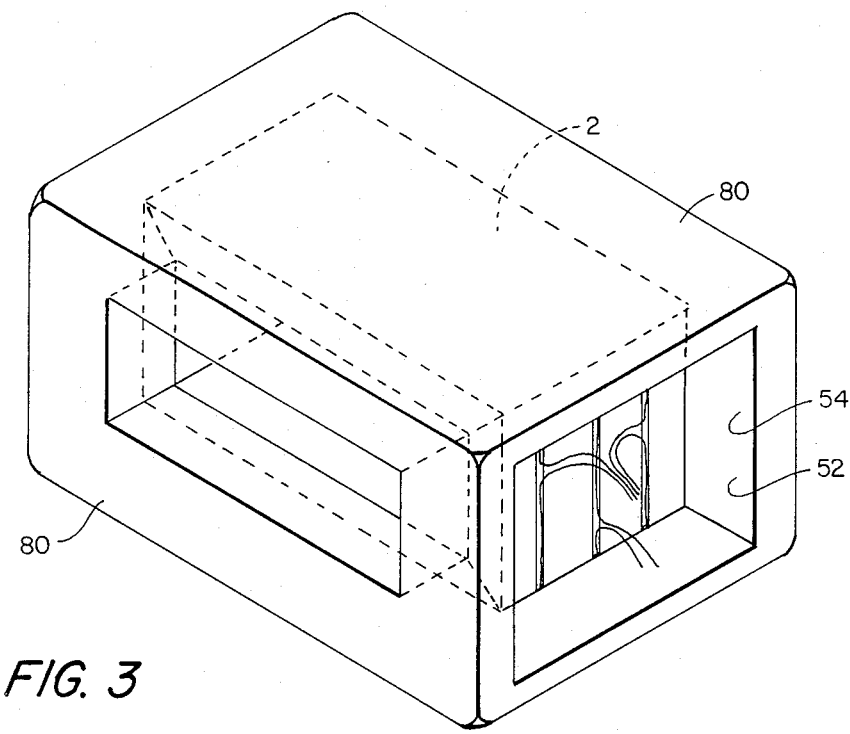
FIG. 3 is a perspective view, similar to FIG. 2, but showing the coating of plastic material applied to the frame and coils to imbed the coils in the plastic material.

With the block 70 filling the aperture 12 and extending in both directions therefrom, the frame and wire assembly is covered with molten plastic as by spraying, dipping, or molding. The plastic may be an epoxy, a foam-in-place plastic, or any such plastic, or plastic-like matter as will readily adhere to the frame and wires. A polyurethane foam type plastic has been found to be advantageous. This material may be applied as a liquid which upon setting goes through an expansion process which fills all voids around the coils. The thickness of the plastic coating should be such as to completely embed the wires and protect them from moisture. In addition, it is desirable to have the plastic layer thick enough to maintain the metal layer, still to be applied, a sufficient distance from the wires 60, it having been discovered that close proximity of the metal casing to the wires greatly diminishes the effectiveness of the assembly. A thickness of about one to six inches is generally deemed sufficient. After application, the plastic coating 80 is allowed to set up and harden (FIG. 3). A cavity 52 is preferably molded at this stage into one end of the assembly to form a compartment 54 for electronic circuitry.

Figure 4:
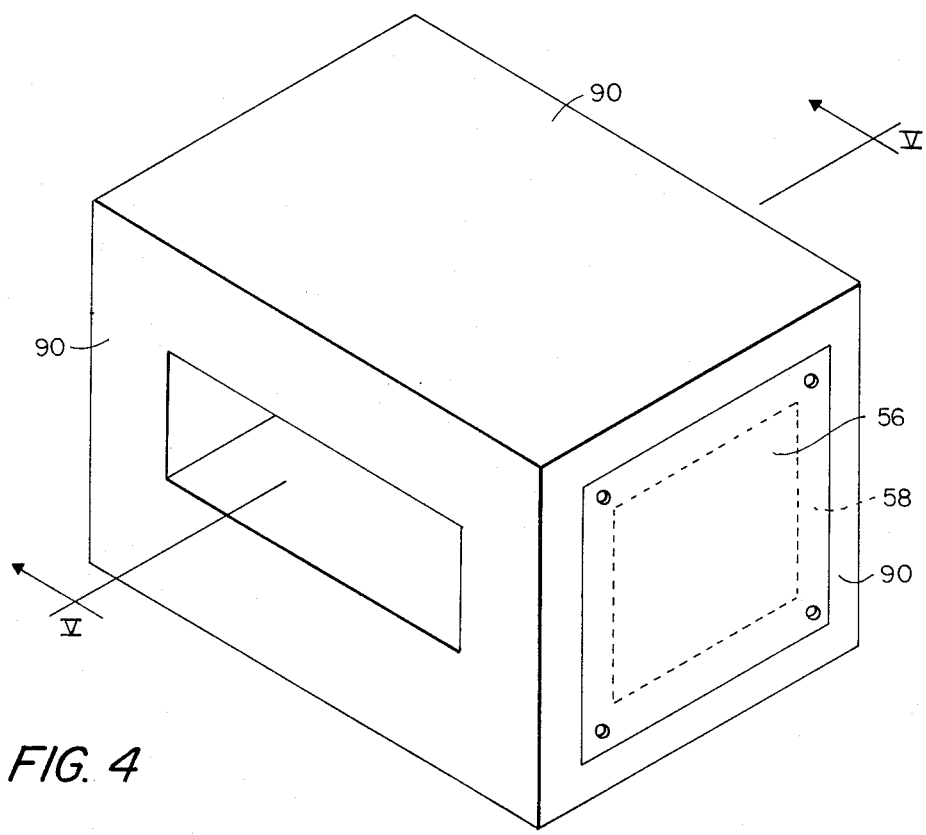
FIG. 4 is a perspective view, similar to FIG. 3, but showing the coating of metal applied to the plastic surface to encase the plastic in a layer of metal.

The present state of the art in the manufacture of metal detector search coil systems requires that a metallic shield be placed around the electrical coils in all directions, except the inspection direction. Accordingly, to the plastic coated coil assembly of FIG. 3 there is added a coating 90 of fluid metal, as by metallic painting, arcspraying, plating, vacuum depositing, and the like. The metal coating 90 completely covers the plastic (FIG. 5), other than in the cavity 52, and adheres thereto. The metal preferably may be zinc, aluminum or stainless steel. The metal 90 is allowed to set up and harden and the block 70 is removed from the aperture 12. A cover plate 56 may be used to cover the compartment 54 (FIG. 4). The cover plate 56 includes an inner surface of conductive material which is insulated by a suitable gasket 58, or the like, from the metallic coating 90. There may be used, for example, a metallic plate 56 with a rubber gasket 58, or a plastic plate 56 having the inner surface coated with conductive material, with the outer margins of the inner surface of the plastic plate left uncoated.

The exposed internal surfaces 14, 22, 30, 40, of the frame 2 are then spray coated with a conductive material 100, such as carbon, which is of reduced conductivity and which creates an electrostatic shield to prevent false readings which might otherwise be occasioned by the passage of a conveyor belt through the coil assembly. This coating 100 is then protected by the insertion of sheet plastic 102. The carbon coating is thereby insulated from the outer metal case and is grounded by a separate connection (not shown).

Figure 5:
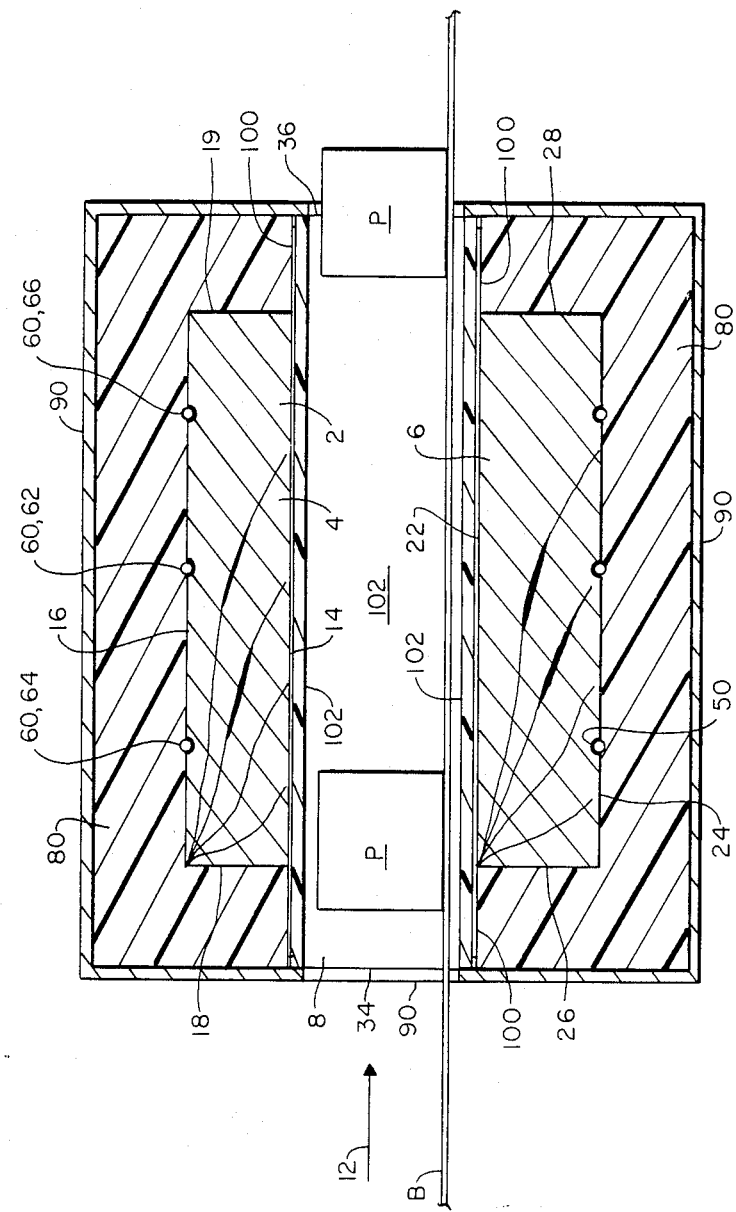
FIG. 5 is a sectional view, taken along line V—V of FIG. 4, and showing a conveyor belt and product thereon to be passed through the detector.

Upon completion of the above series of steps, there is provided a metal detector search coil unit, as shown in FIGS. 4 and 5, including the frame 2, coils of electrically conductive strands 60 wound on the frame, a coating 80 of plastic adhering to and enveloping the frame and wires, and a coating 90 of metal adhering to and enveloping the plastic material.

The search coil assembly is then connected to the remainder of a metal detector apparatus, including a conveyor belt B (FIG. 5) extending through the aperture 12 to convey packages P through the aperture for inspection for metal particles, in accordance with known procedures, and the coil free ends connected to electronic circuitry disposed in the cavity 52 and/or external to the search coil assembly.

It is to be understood that the present invention is by no means limited to the particular construction herein disclosed and/or shown in the drawings, but also comprises any modifications or equivalents within the scope of the disclosure. For example, the aperture 12 may be of any shape required by a given product, such as rounded, square, rectangular, and the like.

Having thus described my invention, what I claim as new and desire to secure by Letters Patent of the United States is:

1. A metal detector search coil assembly comprising a longitudinally elongated frame having an aperture therethrough along its major axis forming a tunnel through which articles to be scanned are passed, a plurality of coils of electrically conductive strands would upon exterior surfaces of top, bottom and side walls coaxially along said frame, plastic material adhered to said surfaces with said coils and frame being embedded in said plastic material, an external casing coating of metal providing a shield adhered to the exterior surface of said plastic material and frame with the exception of the interior walls of said tunnel through which articles to be scanned are passed, said plastic material being formed so as to provide a cavity in one end of said assembly for the housing of electronic circuitry, a coating of conductive material over the inner surface of said tunnel aperature, and spaced at its ends from said casing coating to insulate said casing coating from said coating of conductive material and a plastic sheet protecting the conductive coating material from the outer metal coated case, said metal casing coating being characterized by having been formed and hardened in place on said plastic material containing the coils embedded therein.

* * * * *